(12) United States Patent
Takahashi et al.

(10) Patent No.: US 9,776,446 B2
(45) Date of Patent: Oct. 3, 2017

(54) FRONT FACE SIDE SUBSTRATE FOR THERMAL TRANSFER IMAGE-RECEIVING SHEET, AND THERMAL TRANSFER SHEET

(71) Applicants: Dai Nippon Printing Co., Ltd., Tokyo (JP); Mitsui Chemicals Tohcello, Inc., Tokyo (JP)

(72) Inventors: Hirokazu Takahashi, Tokyo (JP); Junpei Oomura, Tokyo (JP); Hiroshi Matsuura, Tokyo (JP); Hiroshi Honda, Koga (JP)

(73) Assignees: Dai Nippon Printing Co., Ltd., Shinjuku-ku (JP); Mitsui Chemicals Tohcello, Inc., Chiyoda-ku (JP)

( * ) Notice: Subject to any disclaimer, the term of this patent is extended or adjusted under 35 U.S.C. 154(b) by 0 days.

(21) Appl. No.: 15/105,672

(22) PCT Filed: Dec. 9, 2014

(86) PCT No.: PCT/JP2014/082487
§ 371 (c)(1),
(2) Date: Jun. 17, 2016

(87) PCT Pub. No.: WO2015/093340
PCT Pub. Date: Jun. 25, 2015

(65) Prior Publication Data
US 2017/0043604 A1 Feb. 16, 2017

(30) Foreign Application Priority Data
Dec. 18, 2013 (JP) ................................ 2013-261223

(51) Int. Cl.
*B41M 5/41* (2006.01)
*B41M 5/42* (2006.01)
(Continued)

(52) U.S. Cl.
CPC ............... *B41M 5/44* (2013.01); *B32B 27/08* (2013.01); *B32B 27/20* (2013.01); *B32B 27/32* (2013.01);
(Continued)

(58) Field of Classification Search
CPC . B41M 5/41; B41M 5/42; B41M 5/44; B41M 2205/02; B41M 2205/32;
(Continued)

(56) References Cited

U.S. PATENT DOCUMENTS

| 2001/0018125 A1 | 8/2001 | Shibuya et al. |
| 2003/0157313 A1 | 8/2003 | Shibuya et al. |

(Continued)

FOREIGN PATENT DOCUMENTS

| JP | 07-125453 A1 | 5/1995 |
| JP | 2007-022065 A1 | 2/2007 |

(Continued)

OTHER PUBLICATIONS

International Search Report and Written Opinion (Application No. PCT/JP2014/082487) dated Jan. 13, 2015.

*Primary Examiner* — Bruce H Hess
(74) *Attorney, Agent, or Firm* — Burr & Brown, PLLC (57) ABSTRACT

A front face side substrate provided between a supporting member and a receiving layer of a thermal transfer image-receiving sheet. The front face side substrate includes a front face side layer provided on one surface of a substrate layer and a rear face side layer provided on another surface of the substrate layer. The substrate layer includes (A) a propylene-based polymer, (B) calcium carbonate, and (C) titanium oxide, and the weight of (A) is 70% by weight to 94.5% by weight, the weight of (B) is 5% by weight to 28% by weight, and the weight of (C) is 0.5% by weight to 3% by weight, based on the assumption that the total weight of (A), (B) and (Continued)

(C) is 100% by weight. The front face side layer includes a modified propylene-based polymer, and the rear face side layer includes a propylene-based polymer.

20 Claims, 2 Drawing Sheets

(51) Int. Cl.
  *B41M 5/44* (2006.01)
  *B32B 27/20* (2006.01)
  *B32B 27/32* (2006.01)
  *B32B 27/08* (2006.01)

(52) U.S. Cl.
  CPC ............... *B41M 5/41* (2013.01); *B41M 5/42* (2013.01); *B32B 2250/24* (2013.01); *B32B 2250/242* (2013.01); *B32B 2264/102* (2013.01); *B32B 2264/104* (2013.01); *B41M 2205/02* (2013.01); *B41M 2205/32* (2013.01); *B41M 2205/36* (2013.01); *B41M 2205/38* (2013.01)

(58) Field of Classification Search
  CPC ........... B41M 2205/36; B41M 2205/38; B32B 2250/242; B32B 2264/102; B32B 2264/104
  USPC ......................................................... 503/227
  See application file for complete search history.

(56) References Cited

U.S. PATENT DOCUMENTS

| | | |
|---|---|---|
| 2006/0287198 A1 | 12/2006 | Hiraki et al. |
| 2007/0202276 A1 | 8/2007 | Arai et al. |
| 2009/0098364 A1 | 4/2009 | Honda et al. |

FOREIGN PATENT DOCUMENTS

| | | |
|---|---|---|
| JP | 2007-229988 A1 | 9/2007 |
| JP | 2012-158121 A1 | 8/2012 |
| WO | 00/18829 A1 | 4/2000 |
| WO | 2006/121217 A1 | 11/2006 |
| WO | 4941941 B2 | 5/2012 |

Fig. 3

FRONT FACE SIDE SUBSTRATE FOR THERMAL TRANSFER IMAGE-RECEIVING SHEET, AND THERMAL TRANSFER SHEET

TECHNICAL FIELD

The present invention relates to a front face side substrate for thermal transfer image-receiving sheet, and a thermal transfer image receiving sheet.

BACKGROUND ARTS

As a method for forming an image according to the thermal transfer, a sublimation type thermal transfer recording method is known, wherein a thermal transfer sheet in which a colorant layer which includes sublimation type dye is provided on a substrate, and a thermal transfer image-receiving sheet in which a receiving layer is provided on a supporting member are superposed to form a full color image. Since this method uses the sublimation type dye as a color material, it is possible to adjust freely the density and the gradation dot unit by dot unit, a full-color image can be clearly expressed as the original image on the image-receiving sheet. Therefore, this method has been applied in the color image formation for digital cameras, video recorders, computers or the like. Its image can rival silver halide photography with high quality.

In order to obtain good printing properties on the thermal transfer image-receiving sheet to be used for the sublimation transfer recording method, it is known that it is preferable to give heat resistance and cushioning to the thermal transfer image-receiving sheet. With regard to the functional requirements for the heat resistance and the cushioning, for instance, in Patent Literature 1, a thermal transfer image-receiving sheet in which a thermal insulation layer containing a hollow polymer is provided between the supporting member and the receiving layer has been proposed. Further, in addition to the thermal insulation layer as described above, some layers referred to as "micro-voids layer", "hollow particles layer", "void film layer", "void PP layer", etc., are known as the layer which imparts the heat resistance and the cushioning and is provided between the supporting receiving layer and the receiving layer.

Incidentally, with regard to the thermal transfer image-receiving sheet including the thermal insulation layer, thermal history during manufacturing of the thermal transfer image-receiving sheet generates shrinkage stress in the thermal insulation layer, and thus, a curl owing to the shrinkage stress is liable to occur in the thermal insulation layer. Furthermore, thermal history during image formation in which a thermally transferred image is formed on the receiving layer also generates shrinkage stress in the thermal insulation layer, and thus, a curl is liable to occur on the entire printed matter which has the thermally transferred image formed on the receiving layer thereof. Due to a relationship between the curl and the supporting member of the thermal transfer image-receiving sheet, in many cases, the curl is generally curled inwardly with respect to the thermal transfer image formed face. Thus, it caused a decrease in the appearance of the printed matter which was obtained by forming a thermal transfer image onto the receiving sheet of the thermal transfer image-receiving sheet, for example, when displaying photograph as the printed matter to the wall. Further, even when the curling does not immediately occur on the thermal transfer image formation, the curling may occur in time course if shrinkage stress is inherent in the thermal insulation layer. In addition to the layer referred as to "thermal insulation layer", this point is similarly applicable to various layers which each are provided between the supporting member and the receiving layer for the purpose of heat resistance and cushioning properties.

In order to reduce the occurrence of the curling, it is considered that it is an effective countermeasure to reduce the shrinkage stress generated in the thermal insulation layer, and, as one means of reduction measures of the shrinkage stress, to reduce the thickness of the thermal insulation layer can be mentioned. However, in a typical thermal insulation layer, when reducing the thickness of the thermal insulation layer to be able to reduce the curling effectively, the heat resistance and cushioning properties which are functions required intrinsically in the thermal insulation layer are also reduced, and thus, it becomes difficult to form an image having a sufficient density on the receiving layer. In other words, it is difficult to form a high quality image on the receiving layer. Furthermore, in many cases, the supporting member of the thermal transfer image-receiving sheet happens to include foreign matters, defects or the like. If the thinned thermal insulation layer is provided on the supporting member having such defects or the like, it is impossible to hide such defects or the like of the supporting member. Furthermore, depending on the characteristics of defects or the like of the supporting member, it may occur density unevenness in the thermal transfer image formed on the receiving layer, which is followed by causing a reduction in printing quality.

Under these circumstances, in Patent Literature 2, as a supporting member for using in a printing paper for digital photographic printer suitable to obtain an image of high print quality, a biaxially oriented layered polypropylene film in which a front face side layer and a rear face side layer are provided on both side of a substrate layer which is made of polypropylene-based polymer composition containing specified amounts of calcium carbonate and titanium oxide. According to Patent Literature 2, by adopting the biaxially oriented layered polypropylene film as the supporting member of the thermal transfer image-receiving sheet, it is possible to obtain a high-quality image. However, with respect to the biaxially oriented layered polypropylene film has been proposed in the literature, when the thickness of the supporting member is reduced in order to suppress the occurrence of curling, it becomes impossible to obtain a high quality image. That is, it is not possible to achieve both of the suppression of occurrence of curling, and the obtaining of a high-quality image.

Further, in Patent Literature 3, a thermal transfer image-receiving sheet has been proposed, wherein the thermal transfer image-receiving sheet comprises a substrate sheet, and a porous layer and a receiving layer which are provided on one surface of the substrate sheet in this order, and wherein the porous layer is composed of a porous film containing polypropylene resin and has a thickness of not more than 30 μm. According to the thermal transfer image-receiving sheet which has been proposed in Patent Literature 3, it is said that it is possible to reduce changing amount of the curl, and to improve the quality after storage under various environments. However, there is room for improvement from the viewpoint of the print quality.

In other words, in the case that the conventionally known supporting members, or the conventional layers are adopted as supporting member of the thermal transfer image-receiving sheet, or a layer provided between the supporting member and the receiving layer, although it is possible to suppress the occurrence of curling when decreasing the thickness of these layers, it becomes difficult to satisfy the printing quality.

PRIOR ART DOCUMENTS

Patent Literature

Patent Literature 1: JP 2007-229988 A
Patent Literature 2: JP Patent No. 4941941
Patent Literature 3: JP 2012-158121 A

SUMMARY OF THE INVENTION

Problems to be Solved by the Invention

The present invention is the one contrived in such a situation, and a main purpose of the present invention is to provide a front face side substrate for thermal transfer image-receiving sheet, which is possible to perform high-quality image formation on the receiving layer, even in the case that the substrate is made thinner in order to suppress the occurrence of the curling, and provide a thermal transfer image-receiving sheet having the front face side substrate for thermal transfer image-receiving sheet.

Means for Solving the Problems

The present invention for solving the above problems is embodied as a front face side substrate for a thermal transfer image-receiving sheet, the front face side substrate for the thermal transfer image-receiving sheet being provided between a supporting member and a receiving layer of the thermal transfer image-receiving sheet; the front face side substrate for the thermal transfer image-receiving sheet comprising a layered structure in which a front face side layer is provided on one surface of a substrate layer and a rear face side layer is provided on another surface of the substrate layer; wherein the substrate layer comprises (A) a propylene-based polymer, (B) calcium carbonate, and (C) titanium oxide, and the weight of (A) being in the range of from not less than 70% by weight to not more than 94.5% by weight, the weight of (B) being in the range of from not less than 5% by weight to not more than 28% by weight, and the weight of (C) being in the range of from not less than 0.5% by weight to not more than 3% by weight, based on the assumption that the total weight of (A), (B) and (C) is 100% by weight; the front face side layer comprises a modified propylene-based polymer; and the rear face side layer comprises a propylene-based polymer.

Further, in the above invention, it is preferable that the front face side layer contains (D) a propylene homopolymer, or (D) the propylene homopolymer and (E) a propylene-αolefin random copolymer, wherein when not containing (E), the (D) is the modified propylene-based polymer, and when containing the (E), the weight of (E) is not more than 50% by weight, based on the assumption that the total weight of (D) and (E) is 100% by weight; and either or both of (D) and (E) is the modified propylene-based polymer.

Further, in the above invention, it is preferable that the rear face side layer contains (F) a propylene homopolymer, and (G) a propylene-αolefin random copolymer, and the weight of (F) is in the range of from not less than 40% by weight to not more than 90% by weight, based on the assumption that the total weight of (F) and (G) is 100% by weight.

Further, in the above invention, it is preferable that the modified propylene-based polymer is a propylene-based polymer graft-modified with an unsaturated carboxylic acid or a derivative thereof.

Further, in the above invention, it is preferable that the thickness of the front face side layer is in the range of from not less than 0.5 μm to not more than 10 μm. In addition, it is preferable that an adhesive layer is further provided on the front face side layer.

The present invention for solving the above problem is also embodied as a thermal transfer image-receiving sheet, the thermal transfer image-receiving sheet comprising a supporting member, a receiving layer provided on one surface of the supporting member, and the front face side substrate for thermal transfer image-receiving sheet which has the above characteristics and is provided between the supporting member and the receiving member so as to arrange the rear face side layer, the substrate layer and the front face side layer in this order from the supporting member.

Further, in the above invention, the thickness of the supporting member is preferably in the range of from not less than 150 μm to not more than 300 μm.

Effect of the Invention

According to the front face side substrate for thermal transfer image-receiving sheet of the present invention, it is possible to perform high-quality image formation, even in the case that the thermal transfer image-receiving sheet which uses the front face side substrate is made thinner in order to suppress the occurrence of the curl in the thermal transfer image-receiving sheet. In addition, according to the thermal transfer image-receiving sheet of the present invention, it is possible to perform high-quality image formation, even in the case that the front face side substrate for the thermal transfer image-receiving sheet is made thinner in order to suppress the occurrence of the curl. According to an embodiment of the thermal transfer image-receiving sheet of the present invention, it is possible to further enhance the effect of suppressing curling.

EMBODIMENTS FOR CARRYING OUT THE INVENTION

<<Front Face Side Substrate for Thermal Transfer Image-Receiving Sheet>>

Figure 1:
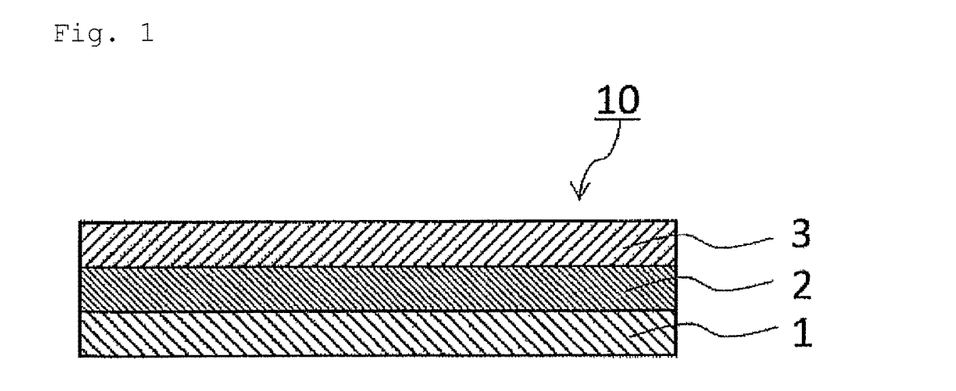
FIG. 1 is a schematic sectional view showing an example of a front face side substrate for thermal transfer image-receiving of the present invention.

Now, the front face side substrate for thermal transfer image-receiving sheet according to the present invention (hereinafter, it is referred to as the front face side substrate of the present invention) will be described in detail with reference to FIG. 1. Here, FIG. 1 is a schematic sectional view of the front face side substrate of the present invention. As shown in FIG. 1, the front face side substrate 10 of the present invention takes a configuration comprising a rear face side layer 1, a substrate layer 2, and a front face side layer 3, which are layered in this order. Next, each of the respective layers in the front face side substrate 10 of the present invention will be described concretely.

(Substrate Layer)

As shown in FIG. 1, the substrate layer 2 is provided between the rear face side layer 1 and the front face side layer 3. The substrate layer 2 is an essential layer in the front face side substrate 10 of the present invention, and it mainly plays roles of heat insulation, cushioning, and masking property. The substrate layer 2 comprises a polymer composition (2) containing at least (A) a propylene-based polymer, (B) calcium carbonate, and (C) titanium oxide. That is, the substrate layer 2 contains at least (A) the propylene-based polymer, (B) the calcium carbonate, and (C) the titanium oxide.

<(A) Propylene-Based Polymer>

The polymer composition (2) constituting the substrate layer 2 contains the propylene-based polymer as an essential component. The propylene based-polymer in relation to the present invention is generally a polyolefin resin which is manufactured and marketed under the name of polypropylene, and which has usually a density of 0.890-0.930 g/cm$^3$, MFR (melt flow rate; ASTM D 1238, Load 2160 g, temperature 230° C.) is 0.5-60 g/10 minutes, preferably, 0.5-10 g/10 minutes, and more preferably, 1-5 g/10 minutes, and which is a homopolymer of propylene, or a random copolymer of propylene and other monomer(s) in a small amount, for example, α-olefin(s) such as ethylene, 1-butene, 1-hexene, 1-octene, or the like, in an amount of not more than 10 mol %. The propylene-based polymer may be a composition consisting of one kind or two or more kinds of polymer(s), for example, may be a composition consisting of a propylene homopolymer and a propylene-α-olefin random copolymer, the molecular weights of which are different from each other.

Although the polymer composition (2) constituting the substrate layer 2 may contain as the propylene-based polymer a propylene homopolymer, or the random copolymer containing the other monomer(s) in an amount of not more than 1 mol % and having a high isotacticity, alone, but it is desirable that the polymer composition (2) contains a propylene homopolymer and a propylene-α-olefin random copolymer having a melting point of 100-150° C., more preferably, 110-145° C. The a propylene-α-olefin random copolymer having a melting point in the above range generally includes α-olefin such as ethylene in an amount of not more than 5 mol %. When the polymer composition (2) constituting the substrate layer 2 contains these propylene-based polymers, it is possible to impart high rigidity to the front face side substrate 10 of the present invention.

<(B) Calcium Carbonate>

The polymer composition (2) constituting the substrate layer 2 contains calcium carbonate as an essential component. According to the front face side substrate which is provided with the substrate layer 2 which is composed of a polymer composition (2) containing calcium carbonate, it is possible to enhance the whiteness of the front face side substrate. Although there is no particular limitation on the particle size of the calcium carbonate, it is desirable that the average particle diameter of the calcium carbonate contained in the polymer composition (2) is in the range of from not less than 1 μm and not more 5 μm, and more preferably, in the range of from not less than 1.5 μm and not more 4 μm. According to the front face side substrate which comprises the substrate layer 2 made of the polymer composition (2) containing calcium carbonate within the above range, it is possible to further enhance the whiteness of the front face side substrate. Incidentally, the particle size of the calcium carbonate used herein is a particle diameter as measured in accordance with the light transmission measurement method by centrifugal sedimentation using an ultra-centrifugal automatic particle size distribution analyzer (Model CAPA-700, manufactured by Horiba, Ltd.).

Moreover, it is preferable that the polymer composition (2) constituting the substrate layer 2 contains calcium carbonate having a maximum particle diameter of not more than 10 μm, preferably, not more than 9 μm.

Further, it is preferable that the polymer composition (2) constituting the substrate layer 2 contains the calcium carbonate having an average particle diameter of from not less than 1 μm and not more 5 μm in a proportion so as to satisfy a condition that the occupying rate of the calcium carbonate having particle diameter of not more than 5 μm is not less than 80% by weight, more preferably, not less than 85% by weight in the particle distribution of total calcium carbonate included. When satisfying the condition that the average particle diameter of the calcium carbonate is in the range of from not less than 1 μm and not more 5 μm, and the condition of including calcium carbonate having the above mentioned particle size distribution in the polymer composition (2), uniform size of the voids due to the calcium carbonate particles can be attained, and thus, the obtained front face side substrate can become a particularly excellent in the whiteness without unevenness.

Furthermore, with respect to the calcium carbonate to be contained in the polymer composition (2) constituting the substrate layer 2, it is preferable that the surface thereof is treated with a higher fatty acid, preferably, a higher fatty acid having a carbon number of 10-28. When adding the calcium carbonate surface-treated with the higher fatty acid in the polymer composition (2) constituting the substrate layer 2, it is possible to prevent the occurrence of foreign material or fish eyes, etc., due to secondary aggregation of calcium carbonate, and thus, the obtained front face side substrate can exhibit a good appearance.

As the higher fatty acids, concretely, for instance, saturated higher fatty acids [$CH_3(CH_2)_nCOOH$, n=8-26], such as decanoic acid, undecanoic acid, lauric acid, tridecyl acid, myristic acid, pentadecyl acid, palmitic acid, heptadecyl acid, stearic acid, nonadecanoic acid, arachidic acid, behenic acid, lignoceric acid, cerotic acid, heptacosanoic acid, etc.; and unsaturated higher fatty acids, such as oleic acid (cis), elaidic acid (trans), cetoleic acid, erucic acid (cis), brassidic acid (trans), linoleic acid, linolenic acid, arachidonic acid, etc.; may be enumerated. Among these, saturated higher fatty acids, particularly, stearic acid is preferable.

In addition, the water content of the calcium carbonate contained in the polymer composition (2) constituting the substrate layer 2 is preferably not more than 0.5% by weight. When adding the calcium carbonate having a water content in this range in the substrate layer 2, the obtained front face side substrate can be uniform, and becomes excellent in the whiteness. Moreover, the whiteness of the calcium carbonate is more preferable to be not less than 90%. The moisture content of calcium carbonate as referred to herein means the amount of water measured by the Karl Fischer method (at temperature condition of 200° C.).

<(C) Titanium Oxide>

The polymer composition (2) constituting the substrate layer 2 contains titanium oxide as an essential component, in addition to the above mentioned (A) propylene-based polymer and the above mentioned (B) calcium carbonate.

The titanium oxide is also known as titanium white, and it includes the rutile type and the anatase type. The rutile type is preferred, since masking effect thereof is larger. In addition, with respect to the titanium oxide to be contained in the polymer composition (2) constituting the substrate layer 2, it is preferable that the surface of the titanium oxide is alumina-treated. Furthermore, it is preferable that the whiteness of the titanium oxide is not less than 95%. When using the surface treated titanium oxide, it is possible to improve further the appearance of the front face side substrate.

The front face side substrate according to the present invention must satisfy, in addition to the condition that the substrate layer comprises (A) the above mentioned propylene-based polymer, (B) the above mentioned calcium carbonate, and (C) the above mentioned titanium oxide; the point that the weight of (A) being in the range of from not less than 70% by weight to not more than 94.5% by weight, the weight of (B) being in the range of from not less than 5% by weight to not more than 28% by weight, and the weight of (C) being in the range of from not less than 0.5% by weight to not more than 3% by weight, based on the assumption that the total weight of (A), (B) and (C) is 100% by weight as an essential condition.

According to the substrate layer 2 which is composed of the polymer composition (2) which contains the components of the above (A), (B), (C), and their contents are within the above mentioned ranges, it is possible to improve cushioning property, masking property and appearance of the front face side substrate.

If the content of (B) the calcium carbonate is in the range of less than 5% by weight, based on the assumption that the total weight of (A), (B) and (C) is 100% by weight, the cushioning property and/or the property will become lower. On the other hand, if the content of (B) the calcium carbonate is in the range of more than 28% by weight, the appearance of the front face side substrate will become lower. Further, if the content of (C) the titanium oxide is in the range of less than 0.5% by weight, based on the assumption that the total weight of (A), (B) and (C) is 100% by weight, the masking property of the front face side substrate will become lower. On the other hand, if the content of (C) the titanium oxide is in the range of more than 3% by weight, the appearance of the front face side substrate will become lower.

Although there is no particular limitation on the average particle size of the titanium oxide contained in the polymer composition (2) constituting the substrate layer 2, it is desirable to be in a range of from not less than 0.1 μm to not more than 0.5 μm, and more preferably, in a range of from not less than 0.2 μm to not more than 0.3 μm, from the viewpoint of further improving the appearance of the front face side substrate. Incidentally, the average particle diameter of titanium oxide as referred to herein means the particle diameter as measured by the light scattering method.

Moreover, the polymer composition (2) constituting the substrate layer 2 may also contain, as optional component(s), any of various additives which are ordinary known to be added to polyolefin, such as, heat stabilizers, weathering stabilizers, ultraviolet absorbers, lubricants, slipping agents, nucleating agents, antiblocking agents, antistatic agents, antifogging agents, pigments, dyes, inorganic compounds other than the above mentioned calcium carbonate and titanium oxide, etc., within a range of not deviating from the object of the present invention, in addition to the above mentioned components.

As the heat stabilizer (antioxidant), for example, phenolic type antioxidants, such as 3,5-di-t-butyl-4-hydroxy toluene, tetrakis [methylene (3,5-di-t-butyl-4-hydroxy) hydro cinnamate] methane, n-octadecyl-3-(4'-hydroxy-3,5-di-t-butyl phenyl) propionate, 2,2'-methylene bis(4-methyl-6-t-butyl phenol), etc.; benzophenone type antioxidants, such as, 2-hydroxy-4-methoxy benzophenone, 2-hydroxy-4-octoxy benzophenone, 2,4-dihydroxy benzophenone, etc.; benzotriazole type antioxidants, such as 2 (2'-hydroxy-5-methyl phenyl) benzotriazole, substituted benzotriazoles, etc.; and, 2-ethyl hexyl-2-cyano-3,3-diphenyl acrylate, ethyl-2-cyano-3,3-diphenyl acrylate, phenyl salicylate, 4-t-butyl-phenyl salicylate, etc., may be enumerated.

As the antistatic agent, for instance, alkyl amines and derivatives thereof, higher alcohols, glycerin esters of higher fatty acids, pyridine derivatives, sulfated oils, soaps, sulfuric ester salts of olefins, alkyl sulfates, fatty acid ethyl sulfonates, alkyl sulfonates, alkyl naphthalene sulfonates, alkyl benzene sulfonates, naphthalene sulfonates, succinic acid ester sulfonates, phosphoric acid ester salts, partial fatty acid esters of polyhydric alcohols, ethylene oxide adducts of fatty alcohols, ethylene oxide adducts of fatty acids, ethylene oxide adducts of fatty amino or fatty acid amides, ethylene oxide adducts of alkyl phenols, ethylene oxide adducts of alkyl naphthols, ethylene oxide adducts of partial fatty acid esters of polyhydric alcohols, polyethylene glycols, etc., may be enumerated.

As the lubricant, for example, stearic acid, stearic acid amide, oleic acid amide, higher alcohols, liquid paraffins, etc., may be enumerated.

As the ultraviolet absorber, for instance, ethylene-2-cyano-3,3'-diphenyl acrylate, 2-(2'-hydroxy-5'-methyl phenyl) benzotriazole, 2-(2'-hydroxy-3'-t-butyl-5'-methyl phenyl) 5-chloro-benzotriazole, 2-hydroxy-4-methoxy benzophenone, 2,2'-dihydroxy-4-methoxy benzophenone, 2-hydroxy-4-octoxy benzophenone, etc., may be enumerated.

Although there is no particular limitation for thickness of the substrate layer 2, it is desirable to be in the range of from not less than 10 μm to not more than 49 μm, and particularly, to be in the range of from not less than 15 μm to not more than 39 μm.

(Front Face Side Layer)

As shown in FIG. 1, one surface of the substrate layer 2 (in the case shown in FIG. 1, the upper surface of the substrate layer 2), the front face side layer 3 is provided. The front face side layer 3 is made of a polymer composition (3) comprising at least a propylene-based polymer which underwent modification. That is, the front face side layer 3 includes at least the propylene-based polymer which underwent modification. Hereinafter, the propylene-based polymer which underwent modification is sometimes referred to as modified propylene-based polymer.

<Modified Propylene-Based Polymer>

The polymer composition (3) constituting the front face side layer 3 contains a modified propylene-based polymer. The polymer composition (3) may contain only the modified propylene-based polymer, or alternatively, may contain an unmodified propylene-based polymer together with the modified propylene-based polymer.

The propylene-based polymer for forming the above-mentioned modified propylene polymer has typically a melt flow rate (MFR) (ASTM D 1238, Load 2160 g, temperature 230° C.) in the range of 0.5-60 g/10 minutes, preferably, 0.5-10 g/10 minutes, and more preferably, 1-5 g/10 minutes.

It is preferable that the polymer composition (3) constituting the front face side layer 3 contains (D) a propylene homopolymer alone, or (D) a propylene homopolymer and (E) a propylene-α-olefin random copolymer. Incidentally, in the case that the polymer composition (3) does not include the above (E), it is preferable that the polymer composition (3) contains, as the above (D), a "modified propylene homopolymer" in which the propylene homopolymer underwent modification. According to the front face side layer 3 made of the polymer composition (3) of this constitution, it is possible to impart a good adhesiveness to the front face side layer 3.

On the other hand, in the case that the polymer composition (3) contains both (D) the propylene homopolymer and (E) the propylene-α-olefin random copolymer, it is preferable that any one of the (D) and the (E), or both of the (D) and the (E) are those which have been modified. Concretely, it is preferable that the polymer composition (3) contains a "modified propylene homopolymer" in which the propylene homopolymer underwent modification and an unmodified propylene-α-olefin random copolymer; or an unmodified propylene homopolymer and "modified propylene-α-olefin random copolymer" in which the propylene-α-olefin random copolymer underwent modification; or a "modified propylene homopolymer" and "modified propylene-α-olefin random copolymer". According to the front face side layer 3 made of the polymer composition (3) of this constitution, it is also possible to impart a good adhesiveness to the front face side layer 3.

Moreover, in the case that the polymer composition (3) constituting the front face side layer 3 contains both of (D) the propylene homopolymer and (E) the propylene-α-olefin random copolymer, it is preferable that the weight of the (E) is not more than 50% by weight, based on the assumption that the total weight of (D) and (E) is 100% by weight.

The propylene-α-olefin random copolymer to be as a base for the "modified propylene-α-olefin random copolymer" is a random copolymer of propylene and other monomer(s) in a small amount, for example, α-olefin(s) such as ethylene, 1-butene, 1-hexene, 4-methyl-1-pentene, 1-octene, or the like, in an amount of not more than 5 mol %. The random copolymer may be a ternary random copolymer composed of propylene and two or more kinds of α-olefins. The propylene-α-olefin random copolymer typically has a melting point in the range of 100-150° C., preferably, in the range of 120-145° C.

The "modified propylene homopolymer", and the "modified propylene-α-olefin random copolymer" are those which are obtained by modifying a propylene homopolymer, or copolymer which is composed mainly of propylene and is of propylene and α-olefin(s) such as ethylene, 1-butene, 1-hexene, 4-methyl-1-pentene, 1-octene, so as to give a polar group into these homopolymer or copolymer. Among them, the propylene homopolymer or the propylene-α-olefin random copolymer that has been graft-modified with an unsaturated carboxylic acid or derivative thereof is preferable in the aspect that when it is added in the polymer composition (3) constituting the front face side layer 3, the adhesiveness between the front face side layer 3 and an adhesive layer which is described later and may be provided optionally onto the front face side layer can be improved.

As the unsaturated carboxylic acid or derivative thereof, for instance, unsaturated carboxylic acids, such as acrylic acid, maleic acid, fumaric acid, tetrahydrophthalic acid, itaconic acid, citraconic acid, crotonic acid, isocrotonic acid, nadic acid (endo-cis-bicyclo [2.2.1] hept-5-ene-2,3-dicarboxylic acid), etc.; or derivatives thereof, such as acid halides, amides, imides, anhydrides, esters, etc., may be enumerated. As concrete examples of such derivatives, for example, malenyl chloride, maleimide, maleic anhydride, citraconic anhydride, monomethyl maleate, dimethyl maleate, glycidyl maleate, etc., may be enumerated. Among them, unsaturated dicarboxylic acids or their anhydrides, particularly, maleic acid, nadic acid or acid anhydrides thereof are preferably used.

With respect to the modified propylene-based polymer which has been graft-modified with an unsaturated carboxylic acid or a derivative thereof, it is desirable that propylene-based polymer has been graft-modified with unsaturated carboxylic or a derivative thereof in an amount of from 0.05 to 15% by weight, preferably, in an amount of from 0.1 to 10% by weight, based on the weight of the propylene-based polymer before modification. Furthermore, the modified propylene polymer has desirably a melt flow rate (MFR) (ASTM D 1238, Load 2160 g, temperature 230° C.) of 0.1-50 g/10 minutes, more preferably, 0.3-30 g/10 minutes.

The polymer composition (3) constituting the front face side layer 3, may also contain, as optional component(s), any of various additives which are ordinary known to be added to polyolefin and has been explained with respect to the above substrate layer 2, such as, heat stabilizers, weathering stabilizers, ultraviolet absorbers, lubricants, slipping agents, nucleating agents, antiblocking agents, antistatic agents, antifogging agents, pigments, dyes, etc., within a range of not deviating from the object of the present invention, in addition to the above mentioned modified propylene-based polymer.

Although there is no particular limitation for thickness of the front face side layer 3, it is desirable to be in the range of from not less than 0.5 µm to not more than 10 µm, and preferably, to be in the range of from not less than 0.5 µm to not more than 5 µm.

(Rear Face Side Layer)

As shown in FIG. 1, the other surface of the substrate layer 2 (in the case shown in FIG. 1, the lower surface of the substrate layer 2), the rear face side layer 1 is provided. The rear face side layer 1 is made of a polymer composition (1) comprising at least a propylene-based polymer. That is, the rear face side layer 1 contains at least the propylene-based polymer.

As the propylene-based polymer contained in the polymer composition (1) constituting the rear face side layer 1, the propylene-based polymer described in the above substrate layer 2 can be used as is, therefore, a detailed description thereof is omitted here.

It is preferable that the polymer composition (1) constituting the rear face side layer 1 contains (F) a propylene homopolymer and (G) a propylene-α-olefin random copolymer. According to the rear face side layer 1 made of the polymer composition (1) of this constitution, it is possible to improve the adhesion of the rear face side layer 1 to a layer in contact with the rear face side layer 1, for example, a supporting member of a thermal transfer image-receiving sheet.

Moreover, in the case that the polymer composition (1) constituting the rear face side layer 1 contains the propylene homopolymer and the propylene-α-olefin random copolymer, it is desirable that the weight of the (F) is not less than 40% by weight and not more than 90% by weight, and more particularly, not less than 50% by weight and not more than 80% by weight, based on the assumption that the total weight of (F) and (G) is 100% by weight.

Moreover, the polymer composition (1) constituting the backing layer 1, as in the cases of the polymer composition (2) constituting the substrate layer 2 and the polymer composition (3) constituting the front face side layer 3, may also contain, as optional component(s), any of various additives which are ordinary known to be added to polyolefin, such as, heat stabilizers, weathering stabilizers, ultraviolet absorbers, lubricants, slipping agents, nucleating agents, antiblocking agents, antistatic agents, antifogging agents, pigments, dyes, etc., within a range of not deviating from the object of the present invention.

There is no particular limitation on the thickness of the back layer 1, and particularly preferably is preferably 0.5 µm or more 10 µm or less, and is 0.5 µm than 5 µm or less.

(Adhesive Layer)

On the front face side layer 3, it is preferable to provide an adhesive layer (not shown). The adhesive layer contains a resin having an adhesive property. Although there is no particular limitation on the resin having the adhesive property, any of polyurethane-based resins is preferred.

<Polyurethane-Based Resin>

As the polyurethane-based resin, for instance, dry laminate, aqueous dry laminate, and solventless laminate which are generally known as filmy adhesive and made of polyurethane-based resin; and polyester-based polyurethane, polyether-based polyurethane or polyurethane polyurea resin which is manufactured as an electron beam-curable laminate adhesive, etc., may be enumerated. Although the polyurethane-based resin may be either water-dispersion type or solvent type, the water-dispersion type polyurethane-based resin is preferable from the viewpoint that it is easy to adjust the degree of crosslinking of the polyurethane resin coating layer and in terms of the working environment of the production site.

The glass transition temperature (Tg) of the polyurethane resin is preferable to be not less than 35° C., and particularly preferable to be not less than 50° C. When the adhesive layer includes the polyurethane-based resin having the above preferred glass transition temperature (Tg), it is possible to obtain a front face side substrate 10 having an excellent blocking resistance.

The polyurethane resin of the preferred glass transition temperature (Tg) can be obtained by various known methods. For example, it can be obtained by selecting appropriately and variously polyether glycol or polyester glycol, or an isocyanate compound. Furthermore, as the polyurethane-based resin, it is also possible to use a commercially available product as it is. For example, it is possible to use a product marketed under the trade name of Takelac WS4000 (Tg=136° C.), a product marketed under the trade name of Takelac W6601 (Tg=124° C.), a product marketed under the trade name Takelac WS5100 (Tg=120° C.), a product marketed under the trade name Takelac W5030 (Tg=80° C.), and a product marketed under the trade names Takelac WS5000 (Tg=65° C.), all of which are manufactured by Mitsui Chemicals, Inc., and the like.

As the aqueous dispersion type polyurethane-based resin, self-emulsifiable type polyurethane-based resins, which are prepared by introducing hydrophilic group(s) such as carboxylate (—COONa, etc.), sulfonate (—SO$_3$Na, etc.) to the main chain or side chain of the polyurethane-based resin, are preferable. In the case of the solvent type, a polyurethane having a three-dimensional structure is formed by using an isocyanate-based resin as a crosslinking agent. On the other hand, in the case of the aqueous dispersion type, since this type is likely to be a linear polyurethane or polyurethane-polyurea resin, it is possible to add a crosslinking agent such as melamine-based resins, epoxy-based resins, imine-based resins, etc., in an amount of 3-10% by weight, based on the weight of the polyurethane-based resin, or, possible to add an acid catalyst in an amount of 0.5-1% by weight, based on the weight of the polyurethane-based resin, in order to accelerate further the curing reaction. Such cross-linking agents do not only improve the water resistance or solvent resistance of an easy-adhesive film, but also contribute to improvement of adhesion.

The adhesive layer may contain, for instance, inorganic fine particles or organic fine particles, for the purpose of preventing blocking, if necessary, in addition to the polyurethane-based resin. Although there is no particular limitation for thickness of the adhesive layer, it is preferable to be in the range of from not less than 0.1 µm to not more than 1 µm, and more particularly, in the range of from not less than 0.1 µm to not more than 0.5 µm.

(Thickness of Front Face Side Substrate)

Although there is no particular limitation on the thickness of the front face side substrate, it is preferable that the thickness of each layer constituting the front face side substrate is in the individual range of the preferred thickness as described above, and the total thickness of the whole front face side substrate is in the range of from not less than 15 µm to not more than 50 µm, and more particularly, in the range of from not less than 18 µm to not more than 40 µm.

<Method of Manufacturing Front Face Side Substrate for Thermal Transfer Image-Receiving Sheet>

The front face side substrate for thermal transfer image-receiving sheet of the present invention may be obtained in accordance with various known methods, for example, by co-extruding the propylene-based polymer composition (2) which will constitute the substrate layer 2 of the front face side substrate for thermal transfer image-receiving sheet, the propylene-based polymer composition (3) which will constitute the front face side layer 3, and the propylene-based polymer composition (1) which will constitute the rear face side layer 1 so as to form a multi-layered film, and subjecting the multi-layered film to biaxial orientation in accordance with a known manufacturing method of biaxially oriented film such as a known simultaneous biaxial stretching method or a known sequential biaxial stretching method. As conditions of biaxial orientation, it is possible to adopt manufacturing conditions in the known biaxially oriented polypropylene, for example, in the sequential biaxial stretching method, the longitudinal stretching temperature of 100° C.-145° C. and the longitudinal stretching ratio in the range of 4- to 7-fold, the transverse stretching temperature of 150° C.-190° C. and the transverse stretching ratio in the range of 8- to 11-fold, may be adaptable.

Further, in the case of providing the adhesive layer on the front face side layer 3, for example, the adhesive layer can be formed on the front face side layer 3 by coating the aqueous solution or dispersion of the above mentioned polyurethane resin for forming the adhesive layer with an coating device which is known per se, for instance, a gravure coater, such as, an air knife coater, a direct gravure coater, a gravure offset coater, an arc gravure coater, an gravure reverse and jet nozzle type gravure coater, etc.; a reverse roll coater, such as, a top feed reverse coater, a bottom feed reverse coater and a nozzle feed reverse coater, etc.; a 5-roll coater, a lip coater, a bar coater, a bar reverse coater, a die coater, etc., so as to satisfying a coating amount, in term of the amount of the composition contained in the aqueous solution of the polyurethane-based resin, of 0.1-20 g/m$^2$, more particularly, of 0.1-1.5 g/m$^2$, and then drying the coated aqueous solution or dispersion out at an temperature of 50-140° C. for at least 3 seconds.

As a method of laminating an adhesive layer on the front face side layer 3, it may take any various known manufacturing method, for instance, a method (in-line coating method) where a polyurethane-based resin or the like is coated on the front face side layer according to the above mentioned procedure continuously after stretching the multilayered sheet in the manner described above, or a method (off-line coating method) where the front face side substrate for the thermal transfer image-receiving sheet is once produced according to the above mentioned procedure, and thereafter, separately, the polyurethane-based polymer or the like is coated on the front face side layer according to the above mentioned procedure, etc.

Furthermore, in order to improve the adhesion to the polyurethane resin, it is possible to apply any conventionally known method, such as corona treatment, flame treatment, or coating (primer treatment) of aromatic ester-based, organic titanate type, or polyethylene imine type compound as an anchor layer on the front face side layer 3, etc., in advance of layering the adhesive layer made of polyurethane-based resin or the like on the front face side layer 3.

<<Thermal Transfer Image-Receiving Sheet>

Figure 2:
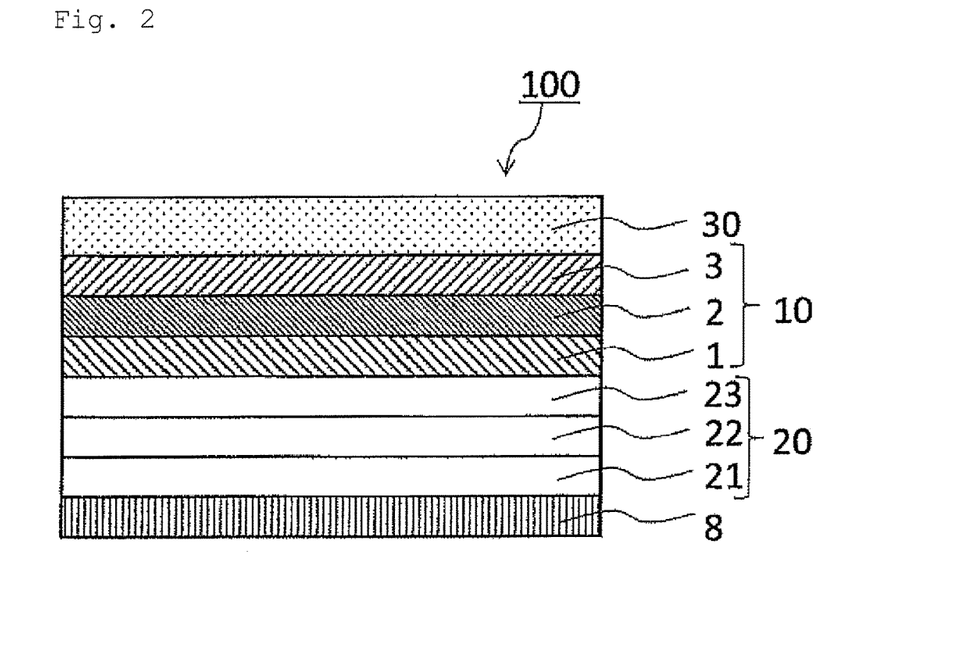
FIG. 2 is a schematic sectional view showing an example of a thermal transfer image-receiving sheet of the present invention.

Next, the thermal transfer image-receiving sheet of the present invention will be described in detail with reference to FIG. 2. FIG. 2 is a schematic sectional view of a thermal transfer image-receiving sheet of the present invention. As shown in FIG. 2, in the thermal transfer image-receiving sheet 100 of the present invention, the receiving layer 30 is provided on one surface of the supporting member 20, and the front face side substrate 10 of the present invention as explained above is provided between the supporting member 20 and the receiving layer 30, so that the rear face side layer 1, the substrate layer 2 and the front face side layer 3 are arranged in this order from the supporting member side.

According to the thermal transfer image-receiving sheet 100 of the present invention having the above structure, since the front face side substrate 10 of the present invention described above is provided between the supporting member 20 and the receiving layer 30, it is possible to form a high-quality thermal transferred image on the receiving layer 30 owing to the heat resistance and the cushioning property own by the front face side substrate, even in the case that the thermal transfer image-receiving sheet which uses the front face side substrate is made thinner in order to suppress the occurrence of the curl in the thermal transfer image-receiving sheet.

Further, 30, since the front face side substrate 10 of the present invention having a masking property is provided between the supporting member 20 and the receiving layer, even when the supporting member 20 happens to include foreign matters, defects or the like, it is possible to conceal these defects, etc., by the front face side substrate 10, and thus, it is possible to improve the texture of the thermal transfer image-receiving sheet.

Now, respective components of the thermal transfer image-receiving sheet 100 of the present invention will be described concretely.

(Supporting Member)

Figure 3:
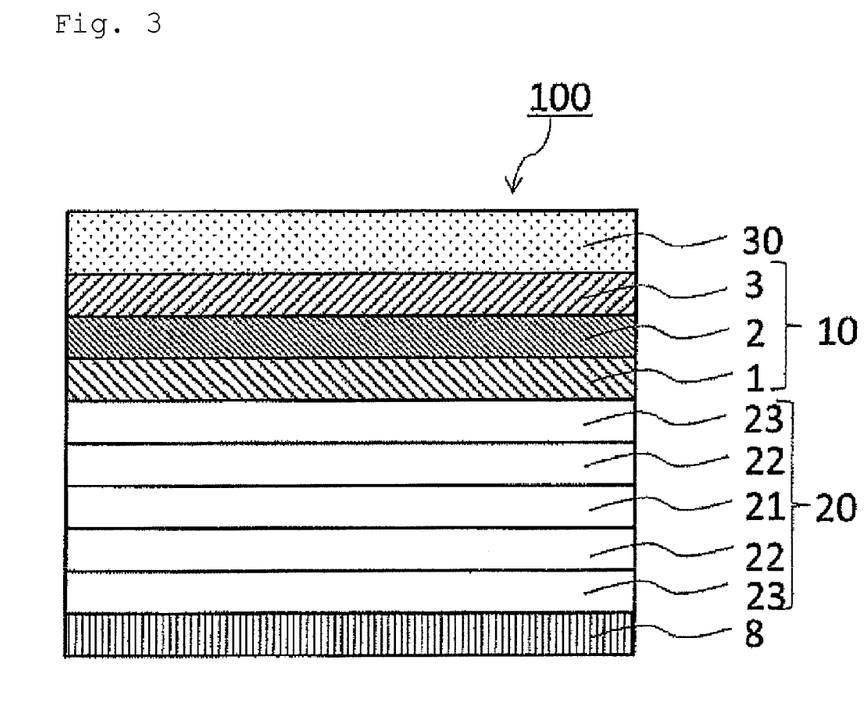
FIG. 3 is a schematic sectional view showing another example of a thermal transfer image-receiving sheet of the present invention.

The supporting member 20 is not particularly limited as long as it can support the front face side substrate 10 of the present invention, and a rear face side layer 8 as an optional constitution. For example, the supporting member 20 may take a layered structure, as shown in FIG. 2, where a core material 21, a polyolefin-based resin layer 22, and adhesive layer 23 are layered in this order, or may take a layered structure, as shown in FIG. 3, where an adhesive layer 23, a polyolefin-based resin layer 22, a core material 21, a polyolefin-based resin layer 22, and an adhesive layer 23 are layered in this order. Alternatively, it may take a single layer structure. As the supporting member 20 of the single-layer structure, for example, the supporting member 20 which consists of the core material 21, the supporting member 20 which consists of a polyolefin-based resin layer 22, etc., may be enumerated.

"Core Material"

As the core material 21, for instance, high quality paper, coated paper, resin coated paper, art paper, cast coated paper, paperboard, synthetic paper (polyolefin-type, polystyrene-type), a synthetic resin or emulsion-impregnated paper, synthetic rubber latex-impregnated paper, synthetic resin internally added paper, cellulose fiber paper, etc., may be enumerated. Although there is no particular limitation for thickness of the core material 21, it may be usually about 10 µm-300 µm, preferably, about 100 µm-250 µm. In the present invention, it is also possible to a commercially available core material, for example, RC paper (trade name: STF-150, manufactured by Mitsubishi Paper Mills Co., Ltd.), coated paper (trade name: Aurora Coat, manufactured by Nippon Paper Industries Co., Ltd.), etc., can be suitably used.

"Polyolefin-Based Resin Layer"

As a component of the polyolefin-based resin layer 22, for instance, polyolefin-based resins, such as polyethylene, polyesters having a high heat resistance such as polyethylene terephthalate and polyethylene naphthalate, polypropylene, polybutene, polyisobutene, polyisobutylene, polybutadiene, polyisoprene, ethylene-vinyl acetate copolymer, etc., may be enumerated. The polyolefin-based resin layer may be one that underwent drawing treatment, or may be one that is unstretched. Further, the polyolefin-based resin layer may contain a white pigment, and/or filler. Also, it may have microvoids therein. The thickness of the polyolefin-based resin layer 22 is usually about 10-40 µm in the dry state.

In the present invention, as shown in FIG. 3, it is preferable to use a supporting member 20 in which polyolefin-based resin layers 22 are provided on both sides of the core material 21. By providing polyolefin-based resin layers 22 on both sides of the core material 21, it is possible to enhance the effect of suppressing the curling which may occur in the thermal transfer image-receiving sheet 100, by a synergistic effect with the front face side substrate of the present invention. In the case where the polyolefin resin layer 22 is provided only on one side of the core material 21, the stress caused by contraction of the polyolefin resin layer 22 or the like would occur only at the face side that the polyolefin resin layer 22 is provided, and depending on the thickness of the front face side substrate of the present invention, it tends to occur a curl in the thermal transfer image-receiving sheet 100.

"Adhesive Layer"

It is preferable that the adhesive layer is provided between the supporting member 20 and the front face side substrate 10. In other words, as shown in FIG. 2 and FIG. 3, it is preferable that the supporting member 20 has a layered structure in which the adhesive layer 23 is located on the surface that is in contact directly with the front face side substrate 10. The adhesive layer 23 includes an adhesive agent and has an adhesive function. As the adhesive agent ingredient, for example, urethane type resins, polyolefin type resins such as α-olefin-maleic anhydride resins, polyester type resin, acrylic resins, epoxy type resins, urea type resins, melamine type resins, phenolic resins, vinyl acetate type resins cyanoacrylate type resins, etc., may be enumerated. Among them, reactive type of or modified type of the acrylic resin can be preferably used. Further, when the adhesive agent is cured with a curing agent, adhesive force is improved, and heat resistance also increases, thus, such an embodiment is preferable. As the curing agent, although isocyanate compounds are generally used, aliphatic amines, cycloaliphatic amines, aromatic amines, acid anhydrides and the like can be also used.

The thickness of the adhesive layer 23 is usually about 2-10 μm in the dry state. As formation of the adhesive layer, it is possible to use any generally used coating procedure, for instance, it can be carried out by coating the adhesive agent in accordance with a known procedure such as gravure printing method, screen printing method, or reverse-coating method using a gravure plate, etc., and then drying the coated film. Alternatively, it may be carried out by EC sand lamination using polyethylene or the like.

Although there is no particular limitation for thickness of the supporting member 20, the thickness of the support (total thickness in the case that the supporting member 20 exhibits a multilayered structure) is preferably in the range of not less than 150 μm. With respect to the thermal transfer image-receiving sheet 100 of the present invention, although the front face side substrate 10 which achieves the effect of suppressing the occurrence of curling is provided between the supporting member 20 and the receiving layer 30, there is a possible case that a slight contraction occurs on the front face side substrate by thermal history or the like at the time of image formation.

Here, the supporting member 20 acts as a resistance force against the contraction stress (shrinkage) which may occur in the front face side substrate 10, and, in proportion to the thickened amount of the thickness of the supporting member 20, the resistance increases, and thus, the contraction stress which may occur in the front face side substrate 10 the front face side substrate can be reduced. Specifically, when the thickness of the supporting member 20 is set to be in the above mentioned preferred thickness, by the synergistic effect of this thickness of the supporting member 20 and the front face side substrate 10 of the present invention, it is possible to eliminate the occurrence of curling, or repress it to be extremely small one, even in the case that the thickness of the front face side substrate is set to be relatively thick thickness. Incidentally, there is no particular limitation for the preferred upper limit of the thickness of the supporting member 20, and it can be appropriately set in consideration of the thickness of the whole thermal transfer image-receiving sheet 100. An example of a preferred upper limit is about 300 μm.

(Receiving Layer)

As shown in FIG. 2 and FIG. 3, on the surface of the front face side substrate 10, a receiving layer 30 is provided. The receiving layer 30 is an essential constituent of the thermal transfer image-receiving sheet 100 which is used in the present invention. The receiving layer contains a binder resin as an essential component.

As the binder resin contained in the receiving layer 30, it is possible to use any conventionally known resin material which can easily receive a dye in the dye layer of a thermal transfer sheet. For example, polyolefin type resins such as polypropylene; halogenated resins such as polyvinyl chloride or polyvinylidene chloride; vinyl type resins such as polyvinyl acetate, vinyl chloride-vinyl acetate copolymer, ethylene-vinyl acetate copolymer, or polyacrylic ester; polyester resins such as polyethylene terephthalate or polybutylene terephthalate; polystyrene type resins; polyamide type resins; copolymer type resins of olefin(s), such as ethylene or propylene, and other vinyl monomer(s); ionomers or cellulose type resins such as cellulose diastase; solvent type resin such as polycarbonate, acrylic type resin; and the like, may be enumerated.

Further, instead of the solvent type resin enumerated as above, it is also possible to use aqueous-based resin such as water-soluble resin, water-soluble polymer, and aqueous resin, as the binder resin. According to the receiving layer 30 containing an aqueous-based resin, as compared with the receiving layer of the solvent type, it is possible to form a high printing density image, also possible to enhance light resistance after image formation, and glossiness.

As the water-soluble resin or water-soluble polymer, for instance, polyvinyl pyrrolidone resins, polyvinyl alcohol resins, gelatin and the like may be enumerated. As the aqueous resin, for instance, a material in which a part of the solvent is comprised of water, such as emulsion or dispersion of vinyl chloride resin, acrylic based resin, or urethane based resin, may be enumerated. The above aqueous resin can be formed, for instance, by dispersing a solution containing a solvent-based resin by a method such as homogenizer.

In addition, the receiving layer 30 may contain a releasing agent for improving the releasability of the thermal transfer sheet. As the releasing agent, for instance, solid waxes such as polyethylene wax, amide wax, Teflon (registered trademark) powder, etc.; fluorine based or phosphate ester based surfactants; silicone oils, various modified silicone oils such as reactive silicone oils and curing type silicone oil, and various silicone resins; etc., may be enumerated.

It is preferable that any of various binder resins as described above is contained in an amount of not less than 50% by weight, based on the total solid content of the receiving layer 30, In particular, when setting the content of the water-soluble resin, the water-soluble polymer, or the aqueous within the above range, it is possible to impart a higher glossiness to the image to be formed. The same applies to the case of using the other binder resin.

There is no particular limitation on the method of forming the receiving layer 30. For instance, the receiving layer 30 can be formed by dissolving or dispersing the binder resin as described above, and optionally in combination with various additives, into an appropriate solvent such as water or an organic solvent in order to prepare a coating liquid for the receiving layer, coating thus prepared coating liquid for the receiving layer in accordance with a known procedure such as gravure printing method, screen printing method, or reverse-coating method using a gravure plate, etc., on the front face side substrate 10, and then drying the coated film.

Although there is also no particular limitation on the thickness of the receiving layer 30, it is preferable to be in the range of about $1 \text{ g/m}^2$-$10 \text{ g/m}^2$ in dried state.

As long as the thermal transfer image-receiving sheet 100 of the present invention satisfies the conditions that the receiving layer 30 is provided on one surface of the supporting member 20 and the above mentioned front face side substrate 10 of the present invention is provided between the supporting member 20 and the receiving layer 30, it is possible to provide any arbitrary layer(s) other than these layers. For instance, it is possible to provide a primer layer (not shown) for preventing the front face side substrate 10 from causing destruction by the solvent of the receiving layer 30, or the like, between the front face side substrate 10 and the receiving layer 30. In addition, between the supporting member 20 and the front face side substrate 10, it is possible to further provide any separate layer(s), for instance, an intermediate layer for improving interlayer adhesiveness.

As shown in FIG. 2 and FIG. 3, with respect to the supporting member 20, on the surface which is not contact with the front face side substrate, it is possible to provide a rear face side layer 8. The rear face side layer 8 is an optional constitution in the thermal transfer image-receiving sheet of the present invention.

There is no particular limitation on the material for the rear face side layer 8, and, for example, resins such as acrylic-based resins, cellulose-based resins, polycarbonate resins, polyvinyl acetal resins, polyvinyl alcohol resins, polyamide resins, polystyrene-based resins, polyester-based resins, halogenated polymers, etc., may be enumerated.

It is more preferred that the resin as mentioned above is cured with a curing agent. As the curing agent, any of the curing agents that are generally known can be used. Among them, isocyanate compounds are preferred. When the above resin is cured and constitutes a three-dimensional structure by forming urethane bonds as a result of causing reaction between the resin and the isocyanate compound or the like, it is possible to improve the heat-resistant storage stability and the solvent resistance of the rear face side layer 8, and further, it is possible to improve adhesiveness to the supporting member 20.

The addition amount of the curing agent is preferably from 1 to 2 per 1 reactive group equivalent of the above exemplified resin. If it is less than 1, it may take a long time to terminate curing, and it may also bring an adverse effect to the heat resistance and the solvent resistance so as to become poor. If it is more than 2, it may cause a change during time after the film formation, and it may cause a problem that the life of the liquid for rear face side layer becomes shorter.

The rear face side layer 8 may contain organic fillers or inorganic fillers as an additive, in addition to the above mentioned resin. By the action of these fillers, it is possible to attain an improvement in the transportability of the thermal transfer image-receiving sheet in the printer, and to prevent occurrence of blocking, and also, to improve the storage stability of the thermal transfer image-receiving sheet. As the organic filler, for example, acrylic-based fillers, polyamide-based fillers, fluorine-based fillers, polyethylene wax, etc., may be mentioned. Among them, polyamide-based fillers are particularly preferred. As the inorganic filler, for example, silicon dioxide, metal oxides, etc., may be enumerated.

As the above mentioned polyamide filler, the one that has a molecular weight of from 100,000 to 900,000 and a spherical shape, and an average particle diameter of 0.01 µm-30 µm is preferable. As the above mentioned polyamide filler, nylon 12 filler is preferable since it is excellent in water resistance, and there is no characteristic change due to water absorption.

(Image Forming Method)

As a method for forming an image on the receiving layer surface by using a thermal transfer image-receiving sheet of the present invention, there is not particularly limitation, and it may be carried out by any known thermal transfer method.

As the thermal transfer sheet to be used during the image formation, it is possible to use a conventional thermal transfer sheet, for instance, wherein a thermally transferable colorant layer is provided on one surface of a substrate such as polyester film, and the rear face side layer is provided on the other surface of the substrate. Next, the thermal transfer sheet will be explained.

(Substrate of Thermal Transfer Sheet)

The substrate of the thermal transfer sheet is not particularly limited, as far as it is the one which has a certain heat resistance and a certain strength, and it is possible to select one arbitrarily from materials known in the art. As such a substrate, for instance, resin films such as polyethylene terephthalate film, 1,4-polycyclohexylene dimethylene terephthalate film, polyethylene naphthalate film, polyphenylene sulfide film, polystyrene film, polypropylene film, polysulfone film, aramide film, polycarbonate film, polyvinyl alcohol film, cellulose derivatives such as cellophane and cellulose acetate, polyethylene film, polyvinyl chloride film, nylon film, polyimide film, ionomer film, etc.; and papers such as condenser paper, paraffin paper, synthetic paper, etc.; non-woven fabric; and complexes of paper or nonwoven fabric and resin; may be enumerated.

Although there is no particular limitation on the thickness of the thermal transfer sheet of the substrate, it is generally to be 0.5 µm-50 µm, preferably about 1.5 µm-10 µm.

The substrate of the thermal transfer sheet may undergo a surface treatment in order to improve the adhesion between adjacent layers. As the surface treatment, it is possible to apply any known resin surface modifying techniques, such as corona discharge treatment, flame treatment, ozone treatment, ultraviolet treatment, radiation treatment, roughening treatment, chemical treatment, plasma treatment, grafting treatment, etc. The surface treatment may be performed singly, or may be performed in combination of two or more kinds. Further, if necessary, an undercoat layer (primer layer) may be provided on its one side or both sides.

(Thermally Transferable Colorant Layer)

When the thermal transfer sheet is a sublimation type thermal transfer sheet, the thermally transferable colorant layer becomes a layer which contains sublimable dye(s). On the other hand, when the thermal transfer sheet is a heat-fusion type thermal transfer sheet, thermally transferable colorant layer becomes a layer which contains a heat-fusion composition which contains coloring agent(s). In addition, for instance, it is possible to use a thermal transfer sheet wherein a layer area containing a sublimable dye and another layer area containing a heat-fusion composition which contains coloring agent(s) may be provided on one continuous substrate as being frame sequentially.

As the sublimable dyes, for instance, diaryl methane type dyes; triaryl methane type dyes; thiazole type dyes; merocyanine dyes; pyrazolone dyes; methine type dyes; indoaniline type dyes; azomethine type dyes such as acetophenoneazomethine, pyrazoloazomethine, imidazoleazomethine, imidazoazomethine, and pyridoneazomethine; xanthene type dyes; oxazine type dyes; cyanostyrene type dyes such as dicyanostyrene and tricyanostyrene; thiazine type dyes; azine type dyes; acridine type dyes; benzeneazo type dyes; azo type dyes such as, pyridoneazo, thiopheneazo, isothiazoleazo, pyrroleazo, pyrazoleazo, imidazoleazo, thiadiazoleazo, triazoleazo, and disazo; spiropyran type dyes; indolinospiropyran type dyes; fluoran type dyes; rhodaminelactam type dyes; naphthoquinone type dyes; anthraquinone type dyes; and quinophthalone type dyes; etc., may be enumerated. Concrete examples of additional dyes include compounds exemplified in JP HEI7-49062 A (1995). It is preferable that the content of the sublimation dye in the thermally transferable colorant layer is in the range of 5% by weight-90% by weight, and more particularly, in the range of 10% by weight-70% by weight, based on the total solid content of the thermally transferable colorant layer. The amount of the sublimable dye used is less than the lower limit of the above described range, the print density may be sometimes lowered. On the other hand, the amount of the sublimable dye used is more than the upper limit of the above described range, the storage stability may be sometimes lowered.

As the binder resins for supporting the dyes, for instance, cellulose type resins such as ethyl cellulose resin, hydroxyethyl cellulose resin, ethylhydroxy cellulose resin, methyl cellulose resin, nitro cellulose resin, cellulose acetate resin, etc.; vinyl-based resins such as polyvinyl alcohol resin, polyvinyl acetate resin, polyvinyl butyral resin, polyvinyl acetal resin, polyvinyl pyrrolidone, etc.; acrylic-based resins such as poly(meth)acrylates and poly(meth)acrylamides; polyurethane-based resins; polyamide-based resins; polyester-based resins, phenoxy resins; phenolic resins; epoxy resins; etc., may be enumerated. Among them, cellulose-based resins, vinyl-based resins, acrylic-based resins, urethane-based resins, polyester-based resins and the like are preferred from the viewpoints of excellent heat resistance and dye transferability.

Furthermore, the thermally transferable colorant layer may include additives such as a releasing agent, inorganic fine particles, organic fine particles, etc. As the release agent, for instance, silicone oils, polyethylene waxes, phosphoric esters may be enumerated. As the silicone oils, straight silicone oil and modified silicone oils and cured products thereof, and the like may be enumerated. The silicone oil may be one of the reactive, or may be of the non-reactive. As the inorganic fine particles, for instance, carbon black, aluminum, molybdenum disulfide, or the like may be enumerated. The modified silicone oils may be classified into reactive silicone oils and unreactive silicone oils. As the reactive silicone oil, for instance, amino-modified, epoxy-modified, carboxyl-modified, hydroxy-modified, methacryl-modified, mercapto-modified, phenol-modified, one terminal reactive and hetero functional group-modified, etc., may be enumerated. As the non-reactive silicone oils, for instance, polyether-modified, methylstyryl-modified, alkyl-modified, higher fatty ester-modified, hydrophilic specially modified, higher alkoxy-modified, fluorine-modified, etc., may be enumerated. It is desirable that the additive amount of the silicone oil is to be in the range of from 0.1 to 15% by weight, more preferably, in the range of from 0.3 to 10 by weight, based on the weight of the binder. As the above organic fine particles, for instance, polyethylene waxes and the like may be enumerated.

The thermally transferable colorant layer can be formed, for example, by dissolving or dispersing the sublimable dye and the binder resin as described above, and optionally in combination with various additives, into an appropriate solvent in order to prepare a coating liquid for the thermally transferable colorant layer, coating thus prepared coating liquid for the thermally transferable colorant layer in accordance with a known procedure on the substrate, and then drying the coated film. As the known procedure, for instance, gravure printing method, reverse-coating method using a gravure plate, roll coater, bar coater, etc., may be enumerated. As the solvent, for instance, toluene, methyl ethyl ketone, ethanol, isopropyl alcohol, cyclohexanone, dimethylformamide [DMF] and the like may be enumerated.

There is no particular limitation on the thickness of the thermally transferable colorant layer, and it is usually about 0.2 μm-5 μm.

(Back Face Layer of Thermal Transfer Sheet)

Furthermore, on the other side of the substrate, a back face layer may be provided in order to improve the thermal resistance and the running property of thermal head at the time of printing and the like.

The back layer of the thermal transfer sheet can be formed by selecting the conventionally known thermoplastic resins and the like appropriately. Such thermoplastic resins include, for instance, polyester-based resins, polyacrylate-based resins, polyvinyl acetate-based resins, styrene acrylate-based resins, polyurethane-based resins, polyolefin-based resins such as polyethylene-based resins and polypropylene-based resins, polystyrene-based resins, polyvinyl chloride-based resins, polyether-based resins, polyamide resins, polyimide-based resins, polyamideimide-based resins, polycarbonate-based resins, polyacrylamide resins, polyvinyl chloride resins, polyvinyl butyral resins, polyvinyl acetal resin, etc., and silicone-modified products of these thermal plastic resins such as polyvinyl acetal resins. Among them, from the viewpoint of heat resistance, the polyamideimide resins or silicone-modified product thereof can be used preferably.

Furthermore, in the back face layer of the thermal transfer sheet, in addition to the thermoplastic resin, it is preferable to add various additives including a releasing agent such as wax, higher fatty acid amide, phosphoric ester compound, metal soap, silicone oil surfactant, etc.; an organic powder such as fluorine resin, etc.; inorganic particles such as silica, clay, talc, calcium carbonate, etc.; for the purpose of improving the slipping property. It is particularly preferable to add at least one of phosphoric ester compound and metal soaps.

The back face layer of the thermal transfer sheet can be formed, for example, by dissolving or dispersing the above mentioned thermoplastic resin, and optionally in combination with various additives, into an appropriate solvent in order to prepare a coating liquid, coating thus prepared coating liquid in accordance with a known procedure such as gravure printing method, screen printing method, and then drying the coated film. It is preferable that the thickness of the back face layer is in the range of not more than 2 μm, and it is more preferable to be in the range of about 0.1 μm-1 μm.

EXAMPLES

The specific constitution of each component used in the substrate layer of Examples and Comparative Examples will be described below.

Propylene-Based Polymer (a1)

As the propylene-based polymer (a1), a propylene-based polymer was prepared by dry-blending (PP-1) propylene homopolymer (melting point=160° C., MFR=3.0 g/10 minutes), and (PP-2) propylene-ethylene random copolymer (melting point=142° C., MFR=7.0 g/10 minutes), so as to contain 75% by weight of the (PP-1) and 25% by weight of the (PP-2).

Calcium Carbonate (b1)

As calcium carbonate (b1), calcium carbonate powder coated with stearic acid (average particle diameter of 1.2 μm) was supplied.

Titanium Oxide (c1)

As titanium oxide (c1), alumina-treated rutile type titanium oxide (average particle diameter of 0.2 μm) was supplied.

Modified Propylene-Based Polymer (PP-3)

As the modified propylene-based polymer (PP-3), maleic anhydride graft modified propylene homopolymer (product name: ADMER, manufactured by Mitsui Chemicals Co., Ltd., melting point=160° C., MFR=3.0 g/10 minutes) was supplied.

Front Face Side Layer (1)

As the front face side layer (1), a front face side layer was prepared by dry-blending the above mentioned (PP-3), and the above mentioned (PP-2) so as to contain 50% by weight of the (PP-3) and 50% by weight of the (PP-2).

Front Face Side Layer (2)

As the front face side layer (2), a front face side layer was prepared by dry-blending the above mentioned (PP-3), and the above mentioned (PP-2) so as to contain 70% by weight of the (PP-3) and 30% by weight of the (PP-2).

Rear Face Side Layer

As the rear face side layer, a rear face side layer was prepared by dry-blending the above mentioned (PP-1), and the above mentioned (PP-2) so as to contain 30% by weight of the (PP-3) and 70% by weight of the (PP-2).

<Preparation of Front Face Side Substrate (1)>

A front face side substrate (1) was prepared such that: onto one surface of a substrate layer (1) which was 24.2 μm in thickness and contained the above prepared propylene-based polymer (a1), the calcium carbonate (b1), and the titanium oxide (c1), wherein the weight of (b1) is 5.4% by weight, based on the total weight of (a1), (b1) and (c), the weight of (c1) is 1.1% by weight, based on the total weight of (a1), (b1) and (c), the above mentioned front face side layer (1) which was 0.5 μm in thickness was provided; and onto another surface of the substrate layer (1), the above mentioned rear face side layer which was 0.5 μm in thickness was provided.

<Preparation of Front Face Side Substrate (2)>

A front face side substrate (2) was prepared such that: onto one surface of a substrate layer (2) which was 18 μm in thickness and contained the above prepared (a1), (b1), and (c1), wherein the weight of (b1) is 12.6% by weight, based on the total weight of (a1), (b1) and (c), the weight of (c1) is 1.3% by weight, based on the total weight of (a1), (b1) and (c), the above mentioned front face side layer (1) which was 1.8 μm in thickness was provided; and onto another surface of the substrate layer (2), the above mentioned rear face side layer which was 0.5 μm in thickness was provided.

<Preparation of Front Face Side Substrate (3)>

A front face side substrate (3) was prepared such that: onto one surface of a substrate layer (3) which was 20.8 μm in thickness and contained the above prepared (a1), (b1), and (c1), wherein the weight of (b1) is 12% by weight, based on the total weight of (a1), (b1) and (c), the weight of (c1) is 1.1% by weight, based on the total weight of (a1), (b1) and (c), the above mentioned front face side layer (2) which was 1.8 μm in thickness was provided; and onto another surface of the substrate layer (3), the above mentioned rear face side layer which was 0.5 μm in thickness was provided.

<Preparation of Front Face Side Substrate (4)>

A front face side substrate (4) was prepared such that: onto one surface of a substrate layer (4) which was 18.2 μm in thickness and contained the above prepared (a1), (b1), and (c1), wherein the weight of (b1) is 13.2% by weight, based on the total weight of (a1), (b1) and (c), the weight of (c1) is 2.2% by weight, based on the total weight of (a1), (b1) and (c), the above mentioned front face side layer (1) which was 4.3 μm in thickness was provided; and onto another surface of the substrate layer (4), the above mentioned rear face side layer which was 0.5 μm in thickness was provided.

<Preparation of Front Face Side Substrate (5)>

A front face side substrate (5) was prepared such that: onto one surface of a substrate layer (5) which was 36.5 μm in thickness and contained the above prepared (a1), (b1), and (c1), wherein the weight of (b1) is 6.0% by weight, based on the total weight of (a1), (b1) and (c), the weight of (c1) is 1.2% by weight, based on the total weight of (a1), (b1) and (c), the above mentioned front face side layer (1) which was 0.5 μm in thickness was provided; and onto another surface of the substrate layer (5), the above mentioned rear face side layer which was 0.5 μm in thickness was provided.

<Preparation of Front Face Side Substrate (A)>

A front face side substrate (A) was prepared such that: onto one surface of a substrate layer (4) which was 19.6 μm in thickness and contained the above prepared (a1), (b1), and (c1), wherein the weight of (b1) is 3.3% by weight, based on the total weight of (a1), (b1) and (c), the weight of (c1) is 1.1% by weight, based on the total weight of (a1), (b1) and (c), the above mentioned front face side layer (1) which was 0.5 μm in thickness was provided; and onto another surface of the substrate layer (A), the above mentioned rear face side layer which was 0.5 μm in thickness was provided.

<Preparation of Front Face Side Substrate (B)>

A front face side substrate (B) was prepared such that: onto one surface of a substrate layer (4) which was 24.2 μm in thickness and contained the above prepared (a1), (b1), and (c1), wherein the weight of (b1) is 10.0% by weight, based on the total weight of (a1), (b1) and (c), the weight of (c1) is 4.0% by weight, based on the total weight of (a1), (b1) and (c), the above mentioned front face side layer (1) which was 0.5 μm in thickness was provided; and onto another surface of the substrate layer (B), the above mentioned rear face side layer which was 0.5 μm in thickness was provided.

Example 1

As the substrate sheet, RC paper (manufactured by Mitsubishi Paper Mills, 190 μm in thickness) was availed. On this substrate, a coating liquid for adhesive layer having the following composition was coated by a gravure coater so as to obtain a coating amount of 5 g/m$^2$ in the dried state, and thereby an adhesive layer is formed. Then, the adhesive layer and the above prepared front face side substrate (1) were stuck together in accordance with the dry lamination procedure. Then, a coating liquid for intermediate layer having the following composition was coated on the front face side substrate (1) by the gravure coater so as to obtain a coating amount of 2 g/m$^2$ in the dried state, and dried at 110° C. for 1 minute, thereby a intermediate layer was formed. Next, a coating liquid for dye-receiving layer having the following composition was coated on the intermediate layer by the gravure coater so as to obtain a coating amount of 4 g/m$^2$ in the dried state, and dried at 110° C. for 1 minute, thereby a dye-receiving layer was formed. Ultimately, a thermal transfer image-receiving sheet of Example 1 in which the substrate sheet/the adhesive layer/the front face side substrate/the intermediate layer/the receiving layer were layered in the order was prepared.

(Coating Liquid for Adhesive Layer)

| | |
|---|---|
| Hydroxyl group containing oligomer (TAKELAC A-969V, manufactured by Mitsui Chemicals Polyurethanes Co., Ltd.) | 45 parts |
| Isocyanate group containing urethane oligomer (TAKENATE A-14, manufactured by Mitsui Chemicals Polyurethanes Co., Ltd.) | 15 parts |
| Ethyl acetate | 45 parts |

<Coating Liquid for Intermediate Layer>

| | |
|---|---|
| Polyester resin (WR-905, manufactured by Nippon Synthetic Chemical Industry Co., Ltd.) | 13.1 parts |
| Titanium oxide (TCA888, manufactured by Tochem Products) | 26.2 parts |
| Fluorescent whitening agent (Benzimidazole derivative) (Uvitex BAC, manufactured by Ciba Specialty Chemicals Inc.) | 0.39 parts |
| Water/isopropyl alcohol [IPA] (Mass ratio 2/1) | 60 parts |

<Coating Liquid for the Dye-Receiving Layer>

| | |
|---|---|
| Vinyl chloride - vinyl acetate copolymer (SOLBIN C, manufactured by Nissin Chemical Industry Co., Ltd.) | 60 parts |
| Epoxy - modified silicone (X-22-3000T, manufactured by Shin-Etsu Chemical Co., Ltd.) | 1.2 parts |
| Metylstyl - modified silicone (24-510, manufactured by Shin-Etsu Chemical Co., Ltd.) | 0.6 parts |
| Methyl ethyl ketone/toluene (mass ratio 1/1) | 5 parts |

Example 2

A thermal transfer image-receiving sheet of Example 2 was obtained by carrying out the same procedure in Example 1 except that the front face side substrate (1) used in Example 1 was replaced by the front face side substrate (2) prepared above.

Example 3

A thermal transfer image-receiving sheet of Example 3 was obtained by carrying out the same procedure in Example 1 except that the front face side substrate (1) used in Example 1 was replaced by the front face side substrate (3) prepared above.

Example 4

A thermal transfer image-receiving sheet of Example 4 was obtained by carrying out the same procedure in Example 1 except that the front face side substrate (1) used in Example 1 was replaced by the front face side substrate (4) prepared above.

Example 5

A thermal transfer image-receiving sheet of Example 5 was obtained by carrying out the same procedure in Example 1 except that the front face side substrate (1) used in Example 1 was replaced by the front face side substrate (5) prepared above.

Comparative Example 1

A thermal transfer image-receiving sheet of Comparative Example 1 was obtained by carrying out the same procedure in Example 1 except that the front face side substrate (1) used in Example 1 was replaced by the front face side substrate (A) prepared above.

Comparative Example 2

A thermal transfer image-receiving sheet of Comparative Example 2 was obtained by carrying out the same procedure in Example 1 except that the front face side substrate (1) used in Example 1 was replaced by the front face side substrate (B) prepared above.

<<Printing Unevenness Evaluation>>

On the receiving layer of each thermal transfer image-receiving sheet of Examples and Comparative Examples, a black solid pattern image was printed by using a commercially available sublimation transfer printer. The printing speed was 1.0 msec/line. With respect to the image-receiving sheets which were printed with gray solid image, the density unevenness of gray was evaluated by visual observation, and evaluated for printing unevenness based on the following evaluation criteria. The evaluation results are shown in Table 1.

<Evaluation Criteria>

⊚: There is no density unevenness and it was excellent in texture.
○: Although there is density unevenness in a certain degree, it was achieved acceptable inconspicuous.
X: There is density unevenness in a larger degree, the texture is bad.

<<Printing Density Evaluation>>

In combination a thermal transfer sheet (genuine product for MEGAPIXEL III, commercialized by ALTECH ADS Corporation) with each individual thermal transfer image receiving sheets of Examples and Comparative Examples, a gradation pattern image was printed under the following printing condition, and then density characteristics was evaluated. The evaluation of printing density was carried out by measuring the maximum density when applying the maximum energy, and evaluating it based on the following evaluation criteria. The optical reflection density was determined by using a spectrometer (Spectrolino, manufactured by GretagMacbeth Corporation) The evaluation results are shown in Table 1.

(Printing Conditions)
Thermal head: F-3598 (manufactured by Toshiba Hokuto Electronics Corporation)
Average resistance of heating element: 5176 ($\Omega$)
Print density in main scanning direction: 300 dpi
Print density in sub scanning direction: 300 dpi
Applied power: 0.12 (W/dot)
Print rate (recording rate): 0.7 msec/line
Print width: 150 mm
Applied voltage: 29 V
1-line period: 2 (msec.)
Pulse Duty: 85%
Printing start temperature: 35.5 (° C.)

<Evaluation Criteria>
⊚: Density is not less than 2.1.
○: Density is not less than 2.0 and less than 2.1.
X: Density is less than 2.0.

TABLE 1

| | Results of Evaluation | |
|---|---|---|
| | Printing unevenness evaluation | Printing density evaluation |
| Example 1 | ○ | ⊚ |
| Example 2 | ○ | ○ |
| Example 3 | ○ | ○ |
| Example 4 | ⊚ | ○ |
| Example 5 | ⊚ | ⊚ |
| Comparative Example 1 | X | X |
| Comparative Example 2 | X | X |

As is apparent from the results in Table 1, according to the thermal transfer image-receiving sheet of Examples 1 to 5 having a front face side substrate that satisfies the subject matter of the present invention, regardless of the thickness of the front face side substrate, it was possible to perform a high concentration of image formation while suppressing the occurrence of printing unevenness. On the other hand, with respect to the thermal transfer image-receiving sheet of Comparative Example 1 in which the content of calcium carbonate was outside the range of the present invention, and the thermal transfer image-receiving sheet of Comparative Example 2 in which the content of titanium oxide is outside the range of the present invention, the printing unevenness occurred when the thickness of the front face side substrate was reduced down to a thickness substantially equal to the thickness of the front face side substrate of the thermal transfer image-receiving sheet of Examples 1 to 5. The concentration of the image formed was low.

<<Evaluation of Curling>>

On each thermal transfer image-receiving sheet of Examples and Comparative Examples, a black solid pattern image was printed by using a thermal transfer sheet (genuine product for MEGAPIXEL III, commercialized by ALTECH ADS Corporation). Thereafter, each sheet which put on a stand was measured about the distance of each four corners of the thermal transfer image-receiving sheet from the stand's surface was measured. The average of the measured distances for each sheet was calculated, and evaluated for curling based on the following evaluation criteria. The evaluation results are shown in Table 2. Here, the evaluation of curling was made only for the thermal transfer image-receiving sheet of each Example.

<Evaluation Criteria>

◎: 0 mm-2 mm.
○: 2 mm-5 mm.
Δ: 5 mm-10 mm.
X: 10 mm-20 mm.

TABLE 2

|  | Evaluation of Curling |
|---|---|
| Example 1 | ○ |
| Example 2 | ◎ |
| Example 3 | ◎ |
| Example 4 | ◎ |
| Example 5 | X |

As is apparent from Table 2, it was possible to suppress the occurrence of curling by continuing to reduce the thickness of the front face side substrate. In addition, even when reducing the thickness of the front face side substrate in order to suppress the occurrence of curling, as shown in Table 1, it was possible to suppress the printing unevenness, and it was also possible to obtain a high density image. In other words, according to the thermal transfer image-receiving sheet having a front face side substrate of the present invention, and according to the thermal transfer image-receiving sheet of the present invention, it was found that it was possible to form a high quality image even when the thickness of the front face side substrate was reduced so as to suppress the occurrence of curling.

EXPLANATION OF THE NUMERALS

10 . . . front face side substrate
1 . . . rear face side layer
2 . . . substrate layer
3 . . . front face side layer
100 . . . thermal transfer image-receiving sheet
20 . . . supporting member
22 . . . polyolefin-based resin layer
23 . . . adhesive layer
30 . . . receiving layer

The invention claimed is:

1. A front face side substrate for a thermal transfer image-receiving sheet,
   comprising a layered structure of a front face side layer, a substrate layer and a rear face side layer in this order;
   the substrate layer comprising (A) a propylene-based polymer, (B) calcium carbonate, and (C) titanium oxide, and the weight of (A) being in the range of from not less than 70% by weight to not more than 94.5% by weight, the weight of (B) being in the range of from not less than 5% by weight to not more than 28% by weight, and the weight of (C) being in the range of from not less than 0.5% by weight to not more than 3% by weight, based on the assumption that the total weight of (A), (B) and (C) is 100% by weight;
   the front face side layer comprising a modified propylene-based polymer; and
   the rear face side layer comprising a propylene-based polymer.

2. The front face side substrate for a thermal transfer image-receiving sheet according to claim 1,
   wherein the front face side layer comprises (D) a propylene homopolymer,
   as the modified propylene-based polymer; or
   wherein the front face side layer comprises (D) a propylene homopolymer and (E) a propylene-α-olefin random copolymer, the weight of (E) is not more than 50% by weight, based on the assumption that the total weight of (D) and (E) is 100% by weight; and either or both of (D) and (E) is the modified propylene-based polymer.

3. The front face side substrate for a thermal transfer image-receiving sheet according to claim 2,
   wherein the rear face side layer contains (F) a propylene homopolymer, and (G) a propylene-α-olefin random copolymer, and the weight of (F) is in the range of from not less than 40% by weight to not more than 90% by weight, based on the assumption that the total weight of (F) and (G) is 100% by weight.

4. The front face side substrate for a thermal transfer image-receiving sheet according to claim 3, wherein an adhesive layer is further provided on the front face side layer.

5. The front face side substrate for a thermal transfer image-receiving sheet according to claim 2, wherein the thickness of the front face side layer is in the range of from not less than 0.5 μm to not more than 10 μm.

6. The front face side substrate for a thermal transfer image-receiving sheet according to claim 5, wherein an adhesive layer is further provided on the front face side layer.

7. The front face side substrate for a thermal transfer image-receiving sheet according to claim 2, wherein an adhesive layer is further provided on the front face side layer.

8. The front face side substrate for a thermal transfer image-receiving sheet according to claim 1,
   wherein the rear face side layer contains (F) a propylene homopolymer, and (G) a propylene-α-olefin random copolymer, and the weight of (F) is in the range of from not less than 40% by weight to not more than 90% by weight, based on the assumption that the total weight of (F) and (G) is 100% by weight.

9. The front face side substrate for a thermal transfer image-receiving sheet according to claim 8, wherein the thickness of the front face side layer is in the range of from not less than 0.5 μm to not more than 10 μm.

10. The front face side substrate for a thermal transfer image-receiving sheet according to claim 9, wherein an adhesive layer is further provided on the front face side layer.

11. The front face side substrate for a thermal transfer image-receiving sheet according to claim 8, wherein an adhesive layer is further provided on the front face side layer.

12. The front face side substrate for a thermal transfer image-receiving sheet according to claim 1, wherein the modified propylene-based polymer is a propylene-based polymer graft-modified with an unsaturated carboxylic acid or a derivative thereof.

13. The front face side substrate for a thermal transfer image-receiving sheet according to claim 12, wherein the thickness of the front face side layer is in the range of from not less than 0.5 μm to not more than 10 μm.

14. The front face side substrate for a thermal transfer image-receiving sheet according to claim 13, wherein an adhesive layer is further provided on the front face side layer.

15. The front face side substrate for a thermal transfer image-receiving sheet according to claim 12, wherein an adhesive layer is further provided on the front face side layer.

16. The front face side substrate for a thermal transfer image-receiving sheet according to claim 1, wherein the thickness of the front face side layer is in the range of from not less than 0.5 μM to not more than 10 μm.

17. The front face side substrate for a thermal transfer image-receiving sheet according to claim 16, wherein an adhesive layer is further provided on the front face side layer.

18. The front face side substrate for a thermal transfer image-receiving sheet according to claim 1, wherein an adhesive layer is further provided on the front face side layer.

19. A thermal transfer image-receiving sheet, comprising:

a supporting member a receiving layer provided on one surface of the supporting member; and a front face side substrate provided between the supporting member and the receiving member;

the front face side substrate comprising a layered structure of a rear face side layer, a substrate layer and a front face side layer, and being arranged in this order from the supporting member;

the substrate layer comprising (A) a propylene-based polymer, (B) calcium carbonate, and (C) titanium oxide, and the weight of (A) being in the range of from not less than 70% by weight to not more than 94.5% by weight, the weight of (B) being in the range of from not less than 5% by weight to not more than 28% by weight, and the weight of (C) being in the range of from not less than 0.5% by weight to not more than 3% by weight, based on the assumption that the total weight of (A), (B) and (C) is 100% by weight;

the front face side layer comprising a modified propylene-based polymer; and the rear face side layer comprising a propylene-based polymer.

20. A thermal transfer image-receiving sheet according to claim 19, wherein the thickness of the supporting member is in the range of from not less than 150 μm to not more than 300 μm.

* * * * *